(12) United States Patent
Essame et al.

(10) Patent No.: US 8,914,181 B2
(45) Date of Patent: Dec. 16, 2014

(54) SYSTEM AND METHOD FOR ACTIVE LANE-CHANGING ASSISTANCE FOR A MOTOR VEHICLE

(75) Inventors: Didier Essame, Le Plessis Robinson (FR); Said El Fassi, Vigneux sur Seine (FR)

(73) Assignee: Siemens S.A.S., St. Denis (FR)

( * ) Notice: Subject to any disclaimer, the term of this patent is extended or adjusted under 35 U.S.C. 154(b) by 0 days.

(21) Appl. No.: 13/977,772

(22) PCT Filed: Sep. 15, 2011

(86) PCT No.: PCT/EP2011/066030
§ 371 (c)(1),
(2), (4) Date: Jul. 29, 2013

(87) PCT Pub. No.: WO2012/089357
PCT Pub. Date: Jul. 5, 2012

(65) Prior Publication Data
US 2013/0338868 A1    Dec. 19, 2013

(30) Foreign Application Priority Data

Dec. 29, 2010   (EP) .................................... 10290681

(51) Int. Cl.
*G08G 1/16*    (2006.01)
*B60W 30/18*   (2012.01)

(52) U.S. Cl.
CPC ............... *G08G 1/161* (2013.01); *G08G 1/162* (2013.01); *G08G 1/167* (2013.01); *B60W 2550/408* (2013.01); *B60W 30/18163* (2013.01)
USPC .......................................................... 701/23

(58) Field of Classification Search
USPC ........................................................ 701/23
See application file for complete search history.

(56) References Cited

U.S. PATENT DOCUMENTS 5,761,630 A    6/1998   Sekine et al.
6,405,132 B1 *  6/2002  Breed et al. ................... 701/301
(Continued)

FOREIGN PATENT DOCUMENTS

DE            19611379 A1    10/1996
DE       10 2009 033 800 A1    3/2010
(Continued)

OTHER PUBLICATIONS

MacNeille, P., et al., "A new technology for a cruise control system", IEEE 58th Annual Vehicular Technology Conference, 2003, pp. 3341-3345, Piscataway, NJ, USA.
(Continued)

*Primary Examiner* — Thomas Tarcza
*Assistant Examiner* — Alex C Dunn
(74) *Attorney, Agent, or Firm* — Laurence A. Greenberg; Werner H. Stemer; Ralph E. Locher

(57) ABSTRACT

A system provides active lane-changing assistance for a motor vehicle to facilitate a lane-changing maneuver from an initial position on a first lane to a final position on a second lane. The system contains a localization device for determining the initial position and transmitting the initial position to a controller. The system has an obstacle detection system for determining a relative position of another vehicle relative to the vehicle and transmitting the relative position of the other vehicle to the controller. The controller determines the final position from the initial position and contains a device for generating a virtual clone capable of creating a virtual clone of the vehicle configured to permit localization of the virtual clone in the final position.

16 Claims, 5 Drawing Sheets

(56) References Cited

U.S. PATENT DOCUMENTS

| | | | |
|---|---|---|---|
| 7,085,637 B2* | 8/2006 | Breed et al. | 701/38 |
| 7,418,372 B2* | 8/2008 | Nishira et al. | 703/2 |
| 7,501,938 B2 | 3/2009 | Widmann et al. | |
| 7,755,510 B2* | 7/2010 | Bilimoria et al. | 340/932 |
| 7,782,179 B2* | 8/2010 | Machii et al. | 340/435 |
| 7,877,187 B2* | 1/2011 | Hori et al. | 701/96 |
| 8,005,615 B2* | 8/2011 | Okabe | 701/301 |
| 8,244,408 B2* | 8/2012 | Lee et al. | 700/301 |
| 8,437,890 B2* | 5/2013 | Anderson et al. | 701/3 |
| 8,515,659 B2* | 8/2013 | Kindo et al. | 701/300 |
| 8,543,261 B2* | 9/2013 | Anderson et al. | 701/3 |
| 8,700,305 B2* | 4/2014 | Hayakawa et al. | 701/301 |
| 2005/0015203 A1* | 1/2005 | Nishira | 701/301 |
| 2010/0228419 A1* | 9/2010 | Lee et al. | 701/25 |

FOREIGN PATENT DOCUMENTS

| | | |
|---|---|---|
| EP | 1312506 A2 | 5/2003 |
| EP | 1577682 A1 | 9/2005 |
| EP | 1726481 A1 | 11/2006 |

OTHER PUBLICATIONS

MacNeille P et al: "A new technology for a cruise control system", Vehicular Technology Conference, 2003. VTC 2003-Fall. 2003 IEEE 58th Orlando, FL, USA Oct. 6-9, 2003; [IEEE Vehicular Technolgy Conference], Piscataway, NJ, USA,IEEE, US, vol. 5, Oct. 6, 2003, pp. 3341-3345, XP010701927.

\* cited by examiner

SYSTEM AND METHOD FOR ACTIVE LANE-CHANGING ASSISTANCE FOR A MOTOR VEHICLE

BACKGROUND OF THE INVENTION

Field of the Invention

The present invention relates to a system and a method for active lane-changing assistance for a motor vehicle, as claimed in the preambles of claims 1 and 10.

In particular, the invention generally relates to the detection of objects, in particular to the detection of objects adjacent to a vehicle and to active lane-changing assistance of said motor vehicle, said vehicle preferably being a self-guided motor vehicle.

The escalation in road traffic, its increasing complexity and the development, on the one hand, of road safety standards and, on the other hand, motor vehicles have led to the development of numerous driving assistance systems, such as for example braking assistance systems, visual and/or auditory guidance systems, anti-skid systems, lane-changing assistance systems or even systems for the detection of the presence of an object in the path of the vehicle. The lane-changing assistance system is generally based on the detection of objects in the vicinity of the vehicle, in particular the detection of the presence of other vehicles, and based on determining the degree of safety associated with said change of lane, as a function of said detection. The lane-changing assistance system has, in particular, been the subject of numerous patents, for example EP 1726481B1 which discloses a system and a method for lane-changing assistance of a vehicle based on a distance measurement which makes it possible to detect if a lateral insertion zone is sufficiently clear to initiate a lane-changing maneuver, EP 1577682B1 which discloses a system for locating objects for a motor vehicle in order to identify lane-changing procedures, EP 1312506B1 which discloses a method and a procedure for assisting the driver of a motor vehicle in lane-changing maneuvers, permitting the driver to be warned about a safety risk associated with said change of lane, or even the patent application US2003/0025597A1 which also discloses a detection of objects adjacent to a vehicle traveling on a road.

Whether the vehicle is a self-guided or automatically guided motor vehicle, i.e. an autonomous vehicle capable of being displaced from an initial position into a final position by its own means, independently of a driver, or a motor vehicle driven by a driver, changing the lane, or line of vehicles, is a critical operation able to be either carried out entirely by a control system of the automatically guided motor vehicle based on data provided by a lane-changing assistance system in the case of said self-guided motor vehicle, or carried out by the driver assisted by said lane-changing assistance system, in the case of a vehicle driven by a driver. In any case, the lane-changing assistance system makes it possible to perform said change of lane in a safe manner and to perform the lane-changing maneuver smoothly.

Unfortunately, current lane-changing assistance systems do not permit easy insertion of a vehicle traveling on a first lane into a second lane adjacent to said first lane, as soon as the traffic increases, given that current lane-changing assistance systems only permit said change of lane when certain safety conditions are adhered to, in particular when an adjacent free space on said second lane is available for said vehicle. Thus, current lane-changing assistance systems are passive systems permitting an insertion of a vehicle in an adjacent lane solely when a space, i.e. sufficient space, is available there. In other words, current lane-changing assistance systems depend on the state of the road traffic. For example, when the traffic is busy or dense, i.e. the inter-vehicle distance no longer permits a safe change of lane, the change of lane is no longer possible. If the traffic is running smoothly and the inter-vehicle distance is sufficient, the lane-changing assistance systems disclosed in the prior art are then capable of assisting said change of lane.

BRIEF SUMMARY OF THE INVENTION

An object of the present invention is to propose a system and a method for lane-changing assistance making it possible to assist a vehicle actively and efficiently to perform a change of lane in complete safety and whatever the traffic on the road ahead. In particular, a further object of the present invention is to permit a self-guided motor vehicle to initiate a lane-changing maneuver irrespective of the state of said traffic on the road ahead.

To this end, a system and a method for lane-changing assistance for a motor vehicle are proposed.

A set of sub-claims also sets forth the advantages of the invention.

Based on a method for lane-changing assistance for a motor vehicle, in particular a self-guided motor vehicle, designed to assist said vehicle to maneuver a change of lane from an initial position on a first lane to a final position on a second lane, said method comprising:

a determination, in particular dynamically and in particular by means of a geodesic system of a localization device, of said initial position of said vehicle and a transmission of said initial position to a controller of a lane-changing assistance system designed to be provided on said vehicle. In particular, said initial position is able to be characterized by a set of initial data which is able, in particular, to comprise the geodesic coordinates of said vehicle. In other words, the method comprises, in particular, a determination by means of geodesic data from said geodesic system of geodesic coordinates of said initial position of said vehicle which is an absolute instantaneous position, depending on the time, of the vehicle relative to a terrestrial reference system. Said determination of the initial position of said vehicle by said localization device by means of its geodesic system permits, in particular, the localization of said vehicle as a function of the time by means of a terrestrial mapping system. In other words, said initial position is thus the absolute instantaneous position of said vehicle, i.e. its position relative to the terrestrial reference system over a period of time;

the method according to the invention is characterized in that it comprises:

at least one determination, in particular by an obstacle detection system, of at least one relative position of at least one other vehicle which is detectable in the vicinity of said vehicle and a transmission of said relative position to said controller. Said other vehicle is, in particular, detectable in the vicinity of said vehicle by said detection system if it is located in a detection zone, of which the geometry may be defined by means of said obstacle detection system. Said geometry of said detection zone is, for example, an ellipse centered on said vehicle, having a length, for example, of at least 200 meters or correlatable to a speed of displacement of said vehicle and, for example, having a width of 50 meters. Said relative position of said other vehicle is an instantaneous position of said other vehicle relative to said motor vehicle (or in other words relative to a reference system associated with said vehicle), said other vehicle being, in particular, adjacent to said motor vehicle, for example in said detection zone on said second lane. Said relative position may, in particular, be characterized by a set of relative data designed to locate said other vehicle relative to said vehicle by means of said mapping system;

a determination, in particular by said controller capable of comprising said mapping system, of said final position as a function of a set of final data, said set of final data comprising at least said initial position and also being capable of comprising at least one relative position and at least one localization datum of a virtual clone of another vehicle. In particular, said final position is a desired absolute instantaneous position on said second lane by said vehicle and able to be characterized by geodesic coordinates. In other words, said final position is the position on the second lane which may be determined, in particular, by said controller as a function of at least one final datum of the set of final data, for example as a function of the relative position of one or more other vehicles and said initial position, and into which said vehicle wishes to be inserted, said final position being defined relative to the terrestrial reference system as a function of the time. Said final position may, in particular, be characterized by said geodesic coordinates and may be correlated with each final datum of said set of final data by means of said mapping system of said controller;

a creation, in particular by a device for generating a virtual clone, of a virtual clone of said vehicle;

an attribution to said virtual clone, in particular by said device for generating a virtual clone, of a localization datum comprising at least said final position, said localization datum being designed to simulate by means of said virtual clone the presence of a dummy real vehicle in said final position. In particular, said localization datum permits a localization of said virtual clone in said final position by each lane-changing assistance system provided on each other vehicle, the relative position thereof being determinable in order to simulate by means of said virtual clone the presence of said dummy real vehicle in said final position. Said virtual clone is thus characterized, in particular, by a localization datum permitting the localization thereof at a location characterized by the geodesic coordinates of said final position;

an emission, in particular by a communication device of said lane-changing assistance system of said vehicle, of said localization datum designed to be received by a communication device of a lane-changing assistance system designed to be provided on said other vehicle. In particular, the method according to the invention may comprise the reception of said localization datum by at least said communication device of said lane-changing assistance system of said other vehicle detectable in the vicinity of said vehicle, in particular as soon as said other vehicle is in the vicinity of said vehicle, for example when it is located in said detection zone;

a management, by each controller provided in a lane-changing assistance system of which the communication device has emitted or received a localization datum, of a displacement of the vehicle provided with the controller as a function of said localization datum.

Based on a lane-changing assistance system designed to be provided on a motor vehicle, in particular a self-guided motor vehicle, and to facilitate a lane-changing maneuver of said vehicle from an initial position on a first lane to a final position on a second lane, said system comprising:

a localization device capable of determining, in particular dynamically and in particular by means of a geodesic system, said initial position of said vehicle and transmitting said initial position to a controller. Said initial position is an absolute instantaneous position of said vehicle. It is, in particular, able to be characterized by a set of initial data permitting a representation of said initial position in a terrestrial reference system as a function of the time, for example by means of a terrestrial mapping system. Said set of initial data permits, in particular, the instantaneous position of said vehicle to be ascertained in order to be able to determine in real time said initial position as a function of the time relative to said terrestrial reference system. In particular, said set of initial data comprises at least the geodesic coordinates of said vehicle, for example latitude, longitude, sea level and time data in order to permit the absolute localization thereof on a map, for example by means of said mapping system;

the system according to the invention is characterized in that it comprises:

an obstacle detection system capable of determining, in particular in a predefinable and/or correlatable detection zone at a speed of displacement of said vehicle, at least one relative position of at least one other vehicle relative to said vehicle, by measuring for example a distance separating said vehicle from said other vehicle, and an angle delimited by a first straight line defined relative to said vehicle, for example the longitudinal axis of the vehicle, and a second straight line intersecting said vehicle and said other vehicle, said detection system also being capable of transmitting said relative position of said other vehicle to said controller. Said relative position is an instantaneous position determinable in real time by said obstacle detection system. It is, in particular, able to be characterized by a set of relative data able, in particular, to comprise relative coordinates of said other vehicle, i.e. the coordinates in real time of said other vehicle relative to said vehicle, said vehicle being taken as a reference. Said obstacle detection system is thus capable of detecting, as a function of the time, the presence of at least one other vehicle in the vicinity of said vehicle. In particular, the obstacle detection system is characterized by a detection field of 360°;

a controller comprising, in particular, a mapping system, a movement management unit and a device for generating a virtual clone, said controller being, on the one hand, capable of determining, in particular in real time and by means of said mapping system, said final position as a function of a set of final data. Said set of final data comprises at least said initial position and is capable of also comprising at least one relative position and at least one localization datum of a virtual clone of another vehicle, said final position being determinable by said controller, in particular by calculating in real time the absolute geodesic coordinates of said final position on said second lane as a function of said final data. Moreover, said controller is also capable of managing, in particular by means of said movement management unit, a displacement of said vehicle as a function of said set of final data;

said device for generating a virtual clone capable of creating a virtual clone of said vehicle and simulating by means of said virtual clone the presence of a dummy real vehicle in said final position by generating a localization datum of said virtual clone of said vehicle designed to permit a localization of said virtual clone in said final position. Said localization datum permits, in particular, said localization of said virtual clone in said final position by at least one further vehicle capable of receiving said localization datum. Preferably, said localization datum is designed to be emitted by a communication device of said lane-changing assistance system and is capable of being received by at least one further communication device to simulate by means of said virtual clone the presence of said dummy real vehicle, in said final position. In particular, said localization datum of said virtual clone comprises instantaneous absolute geodesic coordinates of said final position and thus permits the determination by every other vehicle in the vicinity of said vehicle of the instantaneous absolute position of said virtual clone relative to the terrestrial reference system;

said communication device, for example a radio communication device, capable of exchanging at least one localization datum, in particular at least said localization datum of the virtual clone of said vehicle, with at least one further communication device designed to be provided in a lane-changing assistance system of said other vehicle and with said controller, in order to transmit to said other communication device said localization datum of said virtual clone and/or to receive from said other communication device a localization datum of a virtual clone of said other vehicle and to transmit said localization datum of the virtual clone of said other vehicle to said controller. In other words, the communication device according to the invention is capable of emitting said localization datum of said virtual clone in order that it may be received by at least one further communication device designed to be provided in a lane-changing assistance system of another vehicle and is capable of receiving from said other communication device designed to be provided on a further vehicle at least one localization datum of a virtual clone of said other vehicle in order to transmit it to said controller.

For reasons of clarity, the remainder of this document will consider a set of n vehicles traveling on a road comprising a plurality of lanes, all in the same direction of displacement, from upstream to downstream. Each vehicle of said set of n vehicles is, in particular, provided with said lane-changing assistance system according to the invention. Amongst said n vehicles, a vehicle A is said vehicle wishing to perform a change of lane. Other vehicles belonging to said set of n vehicles, for example vehicles B-I, are vehicles located in the vicinity of said vehicle A.

According to the present invention, the localization device permits, in particular, said vehicle A to be located in real time when said vehicle travels on said road, by determining its initial position, i.e. the absolute position of said vehicle A as a function of the time. The localization device may, in particular, comprise said geodesic system capable of permitting a geolocalization of said vehicle A, for example by means of its geodesic coordinates. The localization of said vehicle A is, in particular, dynamic in that it is able to be continually updated in order to determine accurately at any time said initial position of said vehicle A. The geodesic coordinates characterizing said initial position of said vehicle A are, in particular, able to be continually updated over time in order to ascertain its position over time. The initial position of said vehicle A is a datum included in said set of final data designed to permit the controller to manage the displacement of said vehicle A, in particular as a function of other data able to be included in said set of final data, such as for example a localization datum of a virtual clone of another vehicle, for example one of vehicles B-I and/or the relative position of one or more other vehicles belonging to said set of n vehicles. Advantageously, it is possible that the localization datum of a virtual clone comprises not only said final position but also, in particular, other data useful for a lane-changing maneuver, such as for example at least one datum for characterizing said vehicle A: type of vehicle (car, motorcycle, truck, bus, etc.), dimension of said vehicle (length, width), etc. Preferably said localization datum of said virtual clone is capable of comprising the geodesic coordinates of said final position and characteristic data of said vehicle wishing to perform the change of lane.

Preferably, said controller according to the invention is capable of comprising a mapping system making it possible to locate on a map said initial position of said vehicle A and optionally at least one position relative to another vehicle, in particular one of vehicles B-I, said final position, and a localization datum of a virtual clone of another vehicle, in particular one of vehicles B-I. Said initial position, said final position and said localization datum of the virtual clone of another vehicle are each able to be located by said controller on said map, for example a virtual geographical map or a road map, said map being able to be updated, digitized and installed in the controller of said lane-changing assistance system, in particular in said mapping system of said controller, in order to permit for example a visualization of said initial position and said final position of said vehicle A over time. In particular, each localization datum of a virtual clone of another vehicle received by the communication device of the lane-changing assistance system of said vehicle is capable of being processed by said controller in order to simulate said presence of a dummy real vehicle in the final position of said other vehicle. Said dummy real vehicle may be characterized by data figuring in said localization datum of said virtual clone of said other vehicle, such as for example a length of said dummy real vehicle.

Preferably, said map is a virtual or digital representation of concrete or abstract data located on the terrestrial globe and permitting at least the geolocalization of said vehicle relative to said concrete or abstract data, for example relative to a road, a town, a building, a mountain, etc. Said map may, in particular, comprise geographical data relative to an itinerary which may be defined for said vehicle A, for example between a departure position and an arrival position, between which are included one or more stops or passing points. Thus, said localization device permits, in particular, the controller to determine the initial position of said vehicle A on said map or, in particular, on a predefined itinerary, the geographical data thereof being able to be shown on said map. Advantageously, said system according to the invention is characterized in that said controller comprises at least one data storage medium designed to store the data of said map, for example data of a digital geographical map.

Advantageously, any other vehicle belonging to said set of n vehicles, for example a vehicle B provided with said lane-changing assistance system according to the invention is, in particular, capable of communicating with said lane-changing assistance system of vehicle A, in particular if said other vehicle, i.e. vehicle B, is located in said detection zone of the obstacle detection system. Advantageously, said vehicle B is capable of receiving via its communication device said localization datum of the virtual clone of said vehicle A emitted by the communication device of the lane-changing assistance system of said vehicle A, so that the controller of the vehicle B is able to process said localization datum, in particular simulating said presence of said dummy real vehicle of vehicle A in the location of said final position of said vehicle A. Advantageously, the detection zone of the obstacle detection system and a communication range of the communication device are, in particular, independent of one another. In other words, the communication device may emit or receive one localization datum or a plurality of localization data, in particular irrespective of the detection of a vehicle in said detection zone.

Preferably, said controller according to the invention is capable of correlating each final position with each initial position, each final position with each relative position, or even each final position with each localization datum, said final, initial, relative positions and said localization datum being capable of being located in said set of final data, and said correlation being designed for the management by said controller of said displacement of the vehicle on which it is provided. Advantageously, said obstacle detection system is capable of detecting any mobile or static object located in said detection zone in order to permit the safe displacement from the initial position on the first lane to said final position on the second lane by verifying that a path from said initial position and reaching said final position is free of any obstacle. In particular, said detection system is capable of transmitting to said controller a signal authorizing the displacement, capable of influencing said displacement of said vehicle from its initial position to its final position, for example by validating said displacement managed by said controller if, and only if, a zone encompassing said path is free of any obstacle.

Preferably, the method according to the invention is characterized in that said management of said displacement may, in particular, comprise at least one management of a displacement from said initial position to said final position of the vehicle, of which the lane-changing assistance system has emitted said localization datum, for example vehicle A. Similarly, said management of said displacement may, in particular, comprise a management of a repositioning on said second lane of every other vehicle located upstream of said dummy real vehicle and of which the communication device of the lane-changing system designed to be provided on said vehicle has received said localization datum. In other words, the controller according to the invention designed to be provided in said lane-changing assistance system of said vehicle A is capable of managing a displacement of the vehicle A from said initial position to said final position, taking account of said final data, but also a displacement of said vehicle A designed to create an insertion gap for another vehicle, for example for vehicle C when said vehicle emits a localization datum via its communication device. In other words, said controller is, in particular, also capable of managing a repositioning of the vehicle on which it is provided when the communication device of the vehicle provided with the controller receives a localization datum of a virtual clone of another vehicle and said localization datum is capable of simulating said presence of a dummy real vehicle on the same lane as said vehicle on which it is provided, downstream of said vehicle. Said repositioning which is able to be managed by said controller permits, in particular, an insertion gap to be created, capable of receiving a vehicle wishing to perform a change of lane from a first lane to a second lane. In other words, said management of said displacement according to the invention is, in particular, capable of actively creating an insertion gap at the location of said final position.

Moreover, said management of the displacement according to the present invention is also, in particular, characterized by a determination by said controller of a field of movement for said vehicle on which it is provided. For example, the controller of said lane-changing assistance system is, in particular, capable of managing each displacement of said vehicle A by influencing said displacement by at least one displacement criterion. The field of movement is, in particular, a zone for which said displacement criterion is verified and in which said vehicle A may be displaced in complete safety. Said displacement criterion is, for example, a reception of said signal to authorize the displacement transmitted by said obstacle detection system of said vehicle A, or even a safe inter-vehicle separation distance, said safe inter-vehicle separation distance defining a minimum value of the distance separating the rear of a first vehicle from the front of a second vehicle following said first vehicle, for example the rear of a vehicle C from the front of a vehicle B. Without limitation, said first vehicle may be one of said vehicles belonging to said set of n vehicles but also a dummy real vehicle according to the invention, i.e. a virtual clone of one of said vehicles belonging to said set of n vehicles. Also, said second vehicle may be one of said vehicles belonging to said set of n vehicles but also a dummy real vehicle according to the invention. Said minimum value is preferably designed to warn of any risk to safety when changing lane. Thus, the minimum value of an inter-vehicle separation distance may be a criterion capable of being imposed on the management of a displacement of said vehicle by said controller, in particular applicable to said creation of said insertion gap. Said inter-vehicle separation distance may, in particular, be calculated in real time by said controller from said final data and compared in real time to said safe inter-vehicle separation distance, in order to permit a logical decision process relating to the respect of said displacement criterion based on the inter-vehicle separation distance. Moreover, said lane-changing assistance system may, in particular, be capable of cooperating with a system for preventing collisions in order to guarantee safety for the vehicle wishing to perform said change of lane.

Advantageously, even if said final position of vehicle A is between two other vehicles, for example vehicles B and C, at a location characterized by an inter-vehicle separation distance, separating said two other vehicles which is less than said safe inter-vehicle separation distance, permitting a safe insertion of said vehicle between said two other vehicles, the reception of said localization datum of said virtual clone of said vehicle A by each communication device provided on each lane-changing assistance system of each of said two other vehicles, i.e. said vehicles B and C, and other vehicles located in the vicinity of said vehicle, for example vehicles D-I, permits the controller of every other vehicle located upstream of said final position on said second lane to manage the position of the vehicle on which they are provided, for example by reducing their speed, in order to reposition said vehicle on which it is provided, respecting said safe inter-vehicle separation distance, creating in this manner a location for said virtual clone of said vehicle A respecting said safe inter-vehicle separation distance. Said location permits, therefore, vehicle A wishing to perform the change of lane to carry out said change of lane from the initial position to the final position in complete safety, taking the place of said virtual clone on said second lane.

In particular, the reception of a first and a second localization datum by the same communication device according to the invention is capable of triggering a safety procedure for said vehicle, in particular a movement of said vehicle, such as for example its change of lane. Preferably, when at least two localization data of two different virtual clones are transmitted simultaneously by the communication device to the controller, said controller is capable of varying said displacement management of said vehicle on which it is provided, or ignoring said localization data. On the other hand, in a period starting with the emission by the communication device of a vehicle, for example vehicle A, of said localization datum, and reaching its final position on said second lane by the displacement of said vehicle A, each controller of every other vehicle in the vicinity of said vehicle A, for example, vehicles B-I, is capable of ignoring any other transmission by said communication device of a localization datum emitted in the vicinity thereof, in order to guarantee a safe change of lane. Advantageously, said creation of a virtual clone of a vehicle is, in particular, able to be influenced by the reception of a localization datum of a virtual clone of another vehicle. Preferably, during said initial period starting with the emission by a communication device of a vehicle, for example vehicle A, of the localization datum of its virtual clone and reaching its final position on said second lane by the displacement of said vehicle, the device for generating the virtual clone of every other vehicle in the vicinity of vehicle A is capable of varying the creation of virtual clone thereof.

Moreover, the controller according to the invention is, in particular, capable of cooperating with a system for controlling or guiding the vehicle on which it is provided, said system for controlling or guiding being designed to guide the vehicle on which it is provided. Said guidance system is, for example, an automatic guiding system of the vehicle capable of autonomously guiding said vehicle in order to manage said displacement of said vehicle, in particular. Advantageously, the cooperation of said controller with an automatic guidance system permits said controller to initiate and to manage automatically a change of lane from the initial position on the first lane to the final position on the second lane even if an adjacent free space located in the location of said final position and designed to receive the vehicle is initially unavailable to permit the safe insertion of said vehicle in said final position on the second lane.

Advantageously, the system according to the invention is, in particular, capable of prioritizing i.e. providing a preferential importance to a localization datum from a particular type of vehicle, for example a vehicle taking priority relative to one or more other vehicles, such as an emergency vehicle, such that, in particular, the displacement of said priority vehicle prevails over a displacement of a non-priority vehicle or, in particular, the creation of an insertion gap designed for said priority vehicle prevails over an insertion gap of another non-priority vehicle or a displacement of another non-priority vehicle.

Finally, in order to understand more clearly the present invention, exemplary embodiments and applications of the invention are provided with reference to the following figures:

DESCRIPTION OF THE INVENTION

Figure 1:
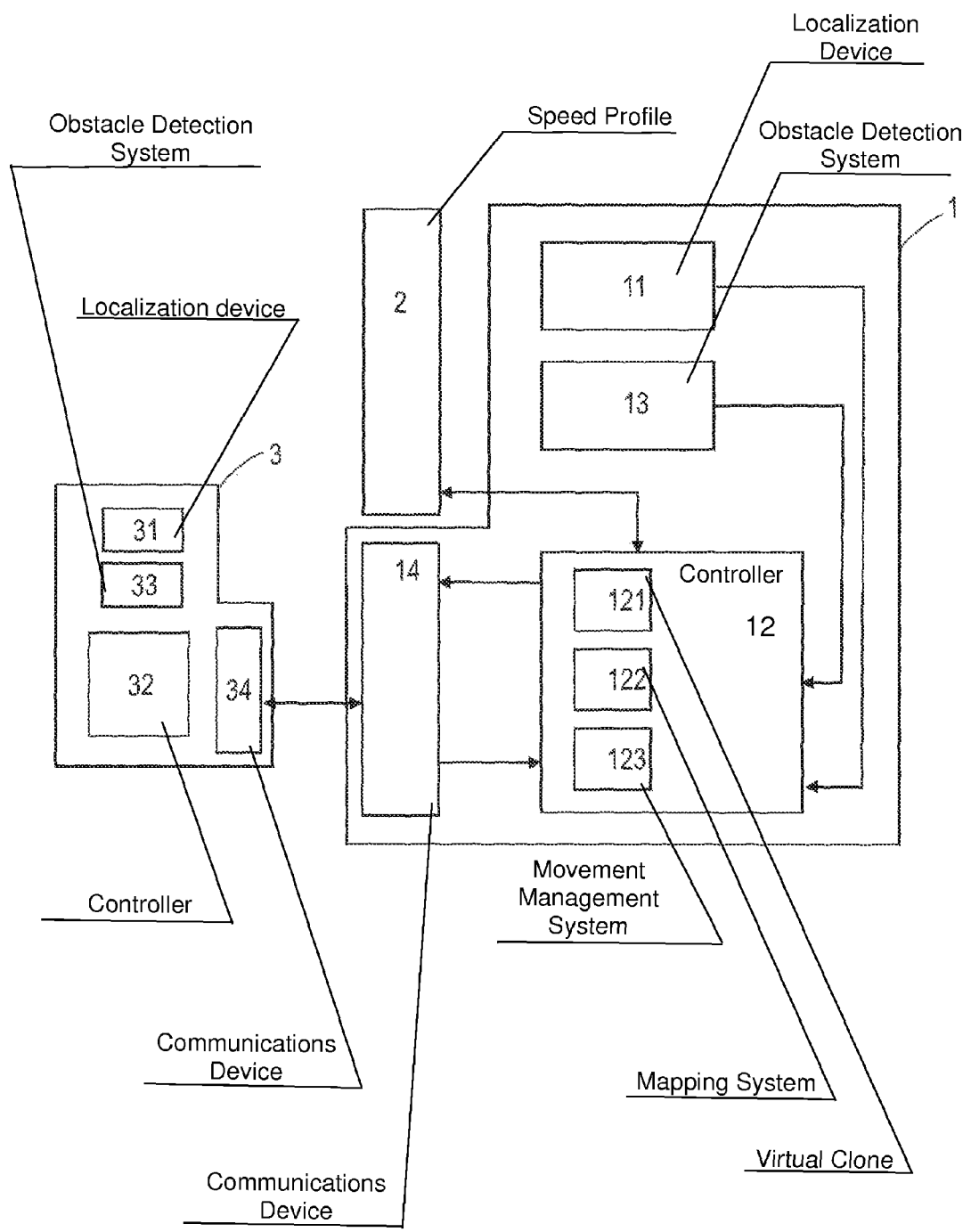
FIG. 1 is an exemplary embodiment of a lane-changing assistance system according to the invention.

FIG. 1 shows an exemplary embodiment of an active lane-changing assistance system 1 according to the invention, designed to be provided on a motor vehicle and to facilitate a lane-changing maneuver from an initial position on a first lane to a final position on a second lane, said system 1 comprising:

a localization device 11 capable of determining said initial position of said vehicle and transmitting said initial position to a controller 12, said initial position being an instantaneous position of said vehicle, determinable in real time, relative to a terrestrial reference system;

and being characterized in that it comprises:

an obstacle detection system 13 capable of determining at least one relative position of at least one other vehicle relative to said vehicle and to transmit said relative position of said other vehicle to said controller 12, said relative position being an instantaneous relative position of said other vehicle, determinable in real time, relative to a reference system associated with said vehicle;

a controller 12 capable of determining said final position as a function of a set of final data comprising at least said initial position, said final position being an instantaneous position, determinable in real time, relative to said terrestrial reference system;

a device for generating a virtual clone 121 capable of creating a virtual clone of said vehicle and simulating by means of said virtual clone the presence of a dummy real vehicle in said final position by generating a localization datum of said virtual clone of said vehicle designed to permit a localization of said virtual clone in said final position;

a communication device 14 capable of exchanging at least one localization datum with at least one further communication device 34 designed to be provided in a lane-changing assistance system 3 of another vehicle and with said controller 12.

Said vehicle is, for example, said vehicle A and said other vehicle is, for example, a vehicle B belonging to said set of n vehicles and is thus capable of being provided with a lane-changing assistance system 3 identical to the lane-changing assistance system 1 provided on said vehicle A and in turn comprising, in particular, said communication device 34, a controller 32, an obstacle detection system 33 and a localization device 31.

In particular, said controller 12 may also comprise a mapping system 122, a movement management unit 123 and said device for generating a virtual clone 121. Preferably, said mapping system 122 may comprise a digital geographical map which is able to be installed on-board and able to be updated, permitting an itinerary to be defined between a departure position and an arrival position for said vehicle A. The localization device 11 permits, in particular, the geodesic coordinates of the initial position of said vehicle A to be transmitted in real time to the controller, so that said controller is able to locate in real time said vehicle A on said digital map, in particular on said itinerary.

Preferably, said obstacle detection system is capable of detecting a mobile or static obstacle in the vicinity of said vehicle A. It may, in particular, be characterized by a detection field of 360 degrees and a detection range capable of defining a detection zone surrounding said vehicle A. The communication device 14 makes it possible, in particular, to exchange with other vehicles located in the vicinity of said vehicle A, in particular with said vehicle B, at least said localization datum of said virtual clone of said vehicle A. In particular, said communication device 14 is capable of emitting said localization datum from the device for generating a virtual clone 121 of said lane-changing assistance system 1 of said vehicle A and receiving at least one localization datum from a communication device 34 of a lane-changing assistance system 3 of another vehicle, for example vehicle B. The communication device 14, 34 which may, for example, be a radio communication device is, in particular, capable of communicating with a traffic control center which is able to monitor road traffic.

The controller 12 provided on the lane-changing assistance system of a vehicle is, in particular, capable of locating on said map each of the initial positions of said vehicle, relative to the other vehicles in the vicinity of said vehicle, and final positions of said vehicle, in addition to said localization datum of a virtual clone of another vehicle. From said set of final data, said controller 12 according to the invention is, in particular, also capable of managing the creation of an insertion gap at said final position on said second lane. To this end, said localization datum of said virtual clone is emitted by said communication device 14 so that every other vehicle in the vicinity of said vehicle is able to detect and receive said localization datum via its own communication device 34.

According to a further embodiment of the present invention, said localization datum of the virtual clone of a vehicle may be emitted by said traffic control center in order to assist said vehicle to change lane. Said localization datum is designed to be received by the communication device 34 of every other vehicle in the vicinity of the vehicle, the lane-changing assistance system 1 thereof having emitted said datum. Said localization datum is then transmitted by said communication device 34 of the lane-changing assistance system 3 of said other vehicle to its controller 32 in order to be processed. If the final position of said vehicle, included in said localization datum, is situated on the same lane as said other vehicle, i.e. said second lane, and if said final position is located downstream of said other vehicle or, in particular, if the dummy real vehicle simulated by said localization datum is the vehicle directly preceding said other vehicle (it is assumed that the set of n vehicles travel in the same direction from upstream to downstream, on several adjacent lanes), then the controller of said lane-changing assistance system 3 of said other vehicle is capable of managing a displacement of said other vehicle capable of creating an insertion gap for said vehicle wishing to perform the change of lane. Said insertion gap may, in particular, comprise features which are able to be correlated with other data included in said localization datum of the virtual clone of said vehicle, such as for example a length of said vehicle. Preferably, said controller 32 is capable of managing a reduction in speed of said other vehicle in order to create said insertion gap between said other vehicle and a vehicle which precedes it on its lane. Advantageously, said obstacle detection system 13, 33 which is provided on each lane-changing assistance system 1, 3 designed to be provided on a vehicle makes it possible, in particular, to maintain a safe inter-vehicle separation distance, such that when a vehicle decelerates, for example to create said insertion gap, the other vehicles located on the same lane as said vehicle which has decelerated and upstream thereof, are capable of maintaining said safe inter-vehicle separation distance.

FIGS. 2a to 2d permit the implementation of a lane-changing maneuver by means of said active lane-changing assistance system for a vehicle according to the invention to be illustrated more clearly. Each of FIGS. 2a-2d has, in identical fashion, part of a road comprising three lanes, respectively a right-hand lane L1, a central lane L2 and a left-hand lane L3, the right-hand lane L1 being located on the right-hand side of the central lane L2 relative to an observer facing downstream and the left-hand lane being located on the left-hand side of the central lane relative to the same observer, and on which said set of n vehicles travels, amongst which vehicles A-I are shown. Each vehicle A-I travels from upstream to downstream.

A graph comprising an axis on the abscissa indicating the position and an axis on the ordinate indicating the speed has three safe speed profiles, respectively a first profile 1, a second profile 2 and a third profile 3, each as a function of the position, respectively x1, x2, x3 of the rear of a vehicle, respectively B, A, C. Each of said profiles comprises, in particular, a rectilinear part at constant speed v, followed by a reduction in speed in order to reach zero speed. Considering, for example, vehicle H, the speed thereof is able to be characterized by the first safe speed profile 1 indicating that vehicle H may approach vehicle B at constant speed v as far as the position x0 determining an inter-vehicle separation distance equal to x1-x0, x1 being the position from the rear of vehicle B. If vehicle H exceeds said position x0, then it will have to decelerate according to the first speed profile 1 given as a function of the positions between the position x0 and the position x1, in order to reach zero speed at x1, i.e. to the rear of vehicle B. Similarly, each vehicle A-I may be characterized by a speed profile such as that described by the first speed profile 1 for vehicle H relative to a vehicle which precedes it.

Figure 2A:
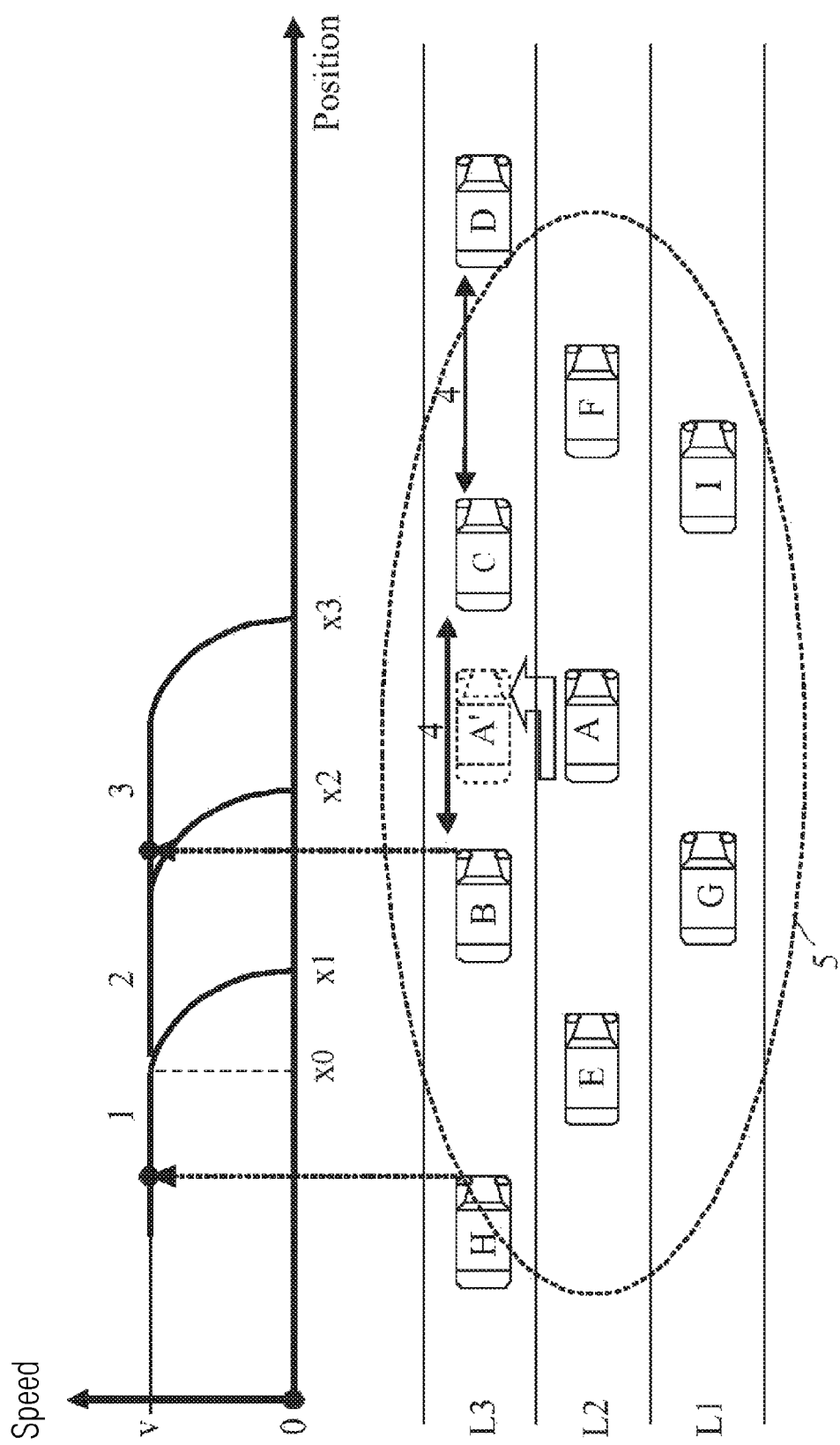
FIG. 2 is an example of implementing a change of lane using a lane-changing assistance system according to the invention.

FIG. 2a shows an example of a road traffic situation in which vehicle A wishes to perform a change of lane from an initial position on the abscissa x2 on a first lane, i.e. the central lane L2, to a final position on the abscissa x2 on a second lane, i.e. the lane L3. Each vehicle A-I of the present example comprises said active lane-changing assistance system according to the invention, as described in FIG. 1. Each vehicle A-I is thus equipped with said obstacle detection system according to the invention. Referring to vehicle A, said obstacle detection system makes it possible, in particular for vehicle A, to detect in a detection zone 5 other vehicles, for example vehicles B-I located in the vicinity of said vehicle A. Said obstacle detection system permits said vehicle A to determine, in particular, the position of said other vehicles B-I relative to its position, in other words the relative position thereof. The controller of said active lane-changing assistance system makes it possible to determine, in particular safely, a range of movement for said vehicle A, in particular as a function of the relative position of said other vehicles B-I. Each vehicle A-I may thus be aware, via the obstacle detection system provided in its active lane-changing assistance system, of vehicles located in the vicinity thereof. Advantageously, each vehicle A-I provided with said active lane-changing assistance system is, in particular, capable of ascertaining a position of a virtual clone of another vehicle on said road. More specifically, if vehicle A decides to change lane to pass from said first lane to said second lane, according to the method according to the invention, it determines by means of the controller provided in its active lane-changing assistance system, a final position on the abscissa x2 on said second lane, in particular as a function of its initial position on the abscissa x2 on the first lane, and the relative positions of the vehicles B-I located in the vicinity thereof. Once the final position has been determined, a virtual clone A' of said vehicle A will be created by said device for generating the virtual clone and a localization datum comprising said final position will be attributed to said virtual clone A'.

Said localization clone of the virtual clone A' of said vehicle A emitted by its communication device is capable of being received by the communication device of the lane-changing assistance system of each other vehicle B-I located in the vicinity of said vehicle A, in order to be processed by the respective controller thereof. The controller of said active lane-changing assistance system according to the invention makes it possible, in particular, to determine, in particular, in safety a range of movement for the vehicle on which it is provided, not only as a function of the relative position of vehicles located in the vicinity thereof but also as a function of the position of a virtual clone of a vehicle located in the vicinity thereof, which may be deduced from said localization datum of said virtual clone of said vehicle located in the vicinity thereof.

Advantageously, the management by said controller of a displacement of the vehicle on which it is provided, as a function of a relative position of another vehicle, differs from the management of a displacement of the vehicle on which it is provided, as a function of a localization datum of a virtual clone emitted by the communication device of a vehicle located in the vicinity thereof. More specifically, the example of vehicles A, B and H will be considered, vehicle A wishing to perform a change of lane and vehicles B and H traveling on the same lane, vehicle H directly following vehicle B. In this case, the management by the controller of the displacement of vehicle A as a function of the relative position of another vehicle, i.e. vehicle B, is capable of being influenced by at least one displacement criterion, for example said safe inter-vehicle separation distance 4 defining a minimum value of the distance separating the rear from the front of two consecutive vehicles, whether the vehicles belong to said set of n vehicles or whether they are dummy real vehicles. The controller is, in particular, capable of calculating the inter-vehicle separation distance in real time from said final data and comparing the distance with said safe inter-vehicle separation distance.

If this inter-vehicle separation distance is a separation distance calculated by a controller provided in the lane-changing assistance system of a vehicle, from a relative position of a vehicle which precedes said vehicle, and if said separation distance becomes less than said safe inter-vehicle separation distance, then said controller is capable of activating a guidance system of said vehicle for the emergency braking of said vehicle in order to avoid any collision with the vehicle which precedes it. This is the case for the controller of vehicle H which is capable of calculating the distance separating vehicle H on which it is provided from vehicle B which precedes it, from said final data, in particular regarding the relative position of vehicle B. If the distance separating vehicle H from vehicle B becomes less than said safe inter-vehicle separation distance, then the controller of vehicle H is capable of activating the guidance system of said vehicle H to decelerate as presented by the first speed profile 1 in order to reach zero speed in the position x1, thus avoiding a collision with said vehicle B.

If this inter-vehicle separation distance is a separation distance calculated by a controller provided in the lane-changing assistance system of a vehicle from a localization datum of a virtual clone of a vehicle and if said virtual clone precedes said vehicle and if said separation distance is less than said safe inter-vehicle separation distance, then said controller is capable of ignoring said virtual clone in order to avoid the emergency braking of said vehicle. This is the case for the controller of vehicle B. The virtual clone A' of vehicle A is located at a distance from vehicle B which is less than said safe inter-vehicle separation distance 4. From now on, the present invention advantageously permits avoiding emergency braking of the vehicle B by authorizing said controller of vehicle B to ignore said virtual clone A' of said vehicle A, which permits vehicle B to continue its route at constant speed v and by maintaining a distance separating it from vehicle C which precedes it, respecting said safe inter-vehicle separation distance.

If said inter-vehicle separation distance is a separation distance calculated by a controller provided in the lane-changing assistance system of a vehicle based on a localization datum of a virtual clone of a vehicle and if said virtual clone precedes said vehicle and if said separation distance is greater than or equal to said safe inter-vehicle separation distance, then said controller is capable of activating a guidance system of said vehicle to maintain at least said safe inter-vehicle separation distance between the vehicle on which it is provided and said virtual clone of said vehicle so as to permit the vehicle having emitted said virtual clone to perform its change of lane. This is the case of the controller of vehicle H relative to the virtual clone A' of vehicle A. As the distance between vehicle H and the virtual clone A' is greater than or equal to said safe inter-vehicle separation distance, the controller of vehicle H is capable of cooperating with the guidance system of said vehicle H so as to maintain a distance between it and said virtual clone A' of vehicle A, fulfilling the displacement criterion based on the safe inter-vehicle separation distance.

Figure 2B:
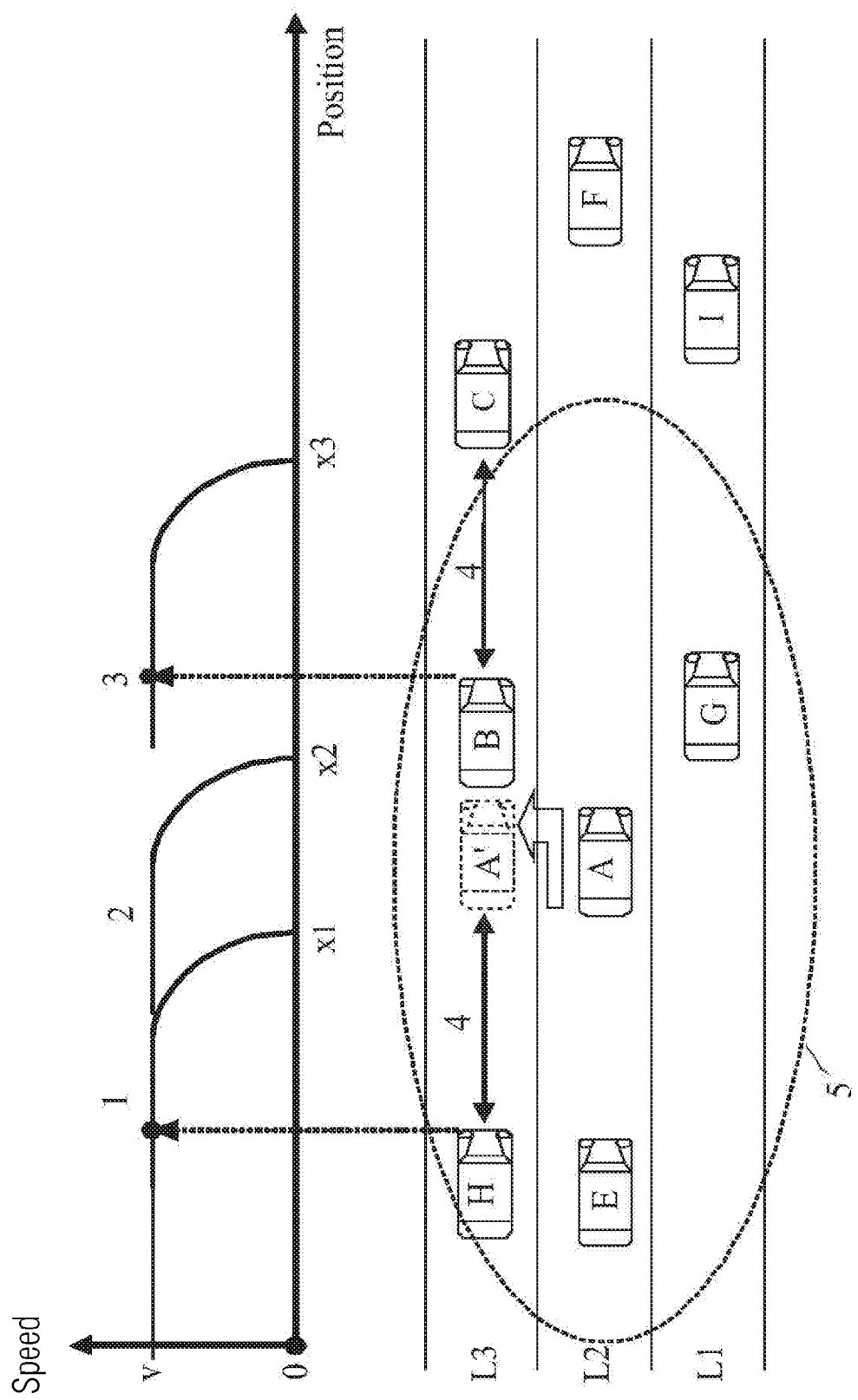
Figure 2C:
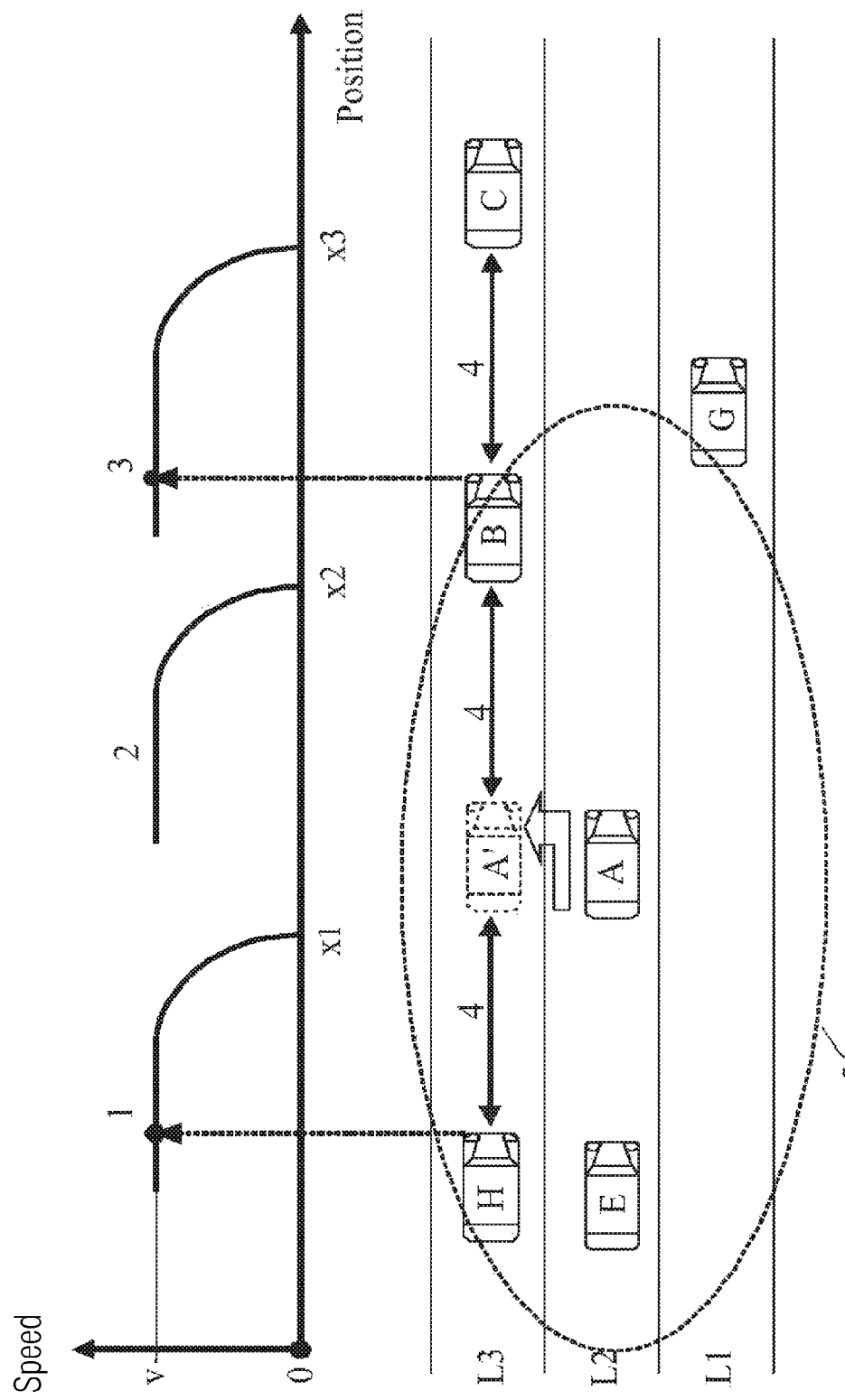

Thus, when a localization datum of a virtual clone is emitted by said vehicle A, each lane-changing assistance system provided on each vehicle B-I in the vicinity of said vehicle A is capable of receiving said localization datum. If the controller of said lane-changing system of a vehicle located in the vicinity of vehicle A determines that the inter-vehicle separation distance separating the vehicle on which it is provided from the virtual clone A' is less than the safe inter-vehicle separation distance, then said virtual clone is ignored. In contrast, if the controller of said lane-changing system of a vehicle located in the vicinity of vehicle A determines that the inter-vehicle separation distance separating the vehicle on which it is provided from the virtual clone is greater than or equal to the safe inter-vehicle separation distance, then the separation distance between said virtual clone and said vehicle is maintained at a value at least equal to said safe inter-vehicle separation distance. Moreover, and as shown in FIG. 2b, said controller provided in the lane-changing assistance system of said vehicle A wishing to perform said change of lane is, in particular, capable of cooperating with a guidance system of said vehicle A so as to maintain an inter-vehicle separation distance, between its virtual clone A' and vehicles H, B which precede it and follow directly its virtual clone A', which is greater than or equal to the safe inter-vehicle separation distance 4. Advantageously, said controller of the vehicle A is, in particular, capable of activating the guidance system of the vehicle on which it is provided to decelerate said vehicle A and to correlate said deceleration of said vehicle A with a modification of said final position of said vehicle A on said second lane, and thus also a modification of the localization datum of the virtual clone A' of said vehicle A, in order to create a free space between said virtual clone A and a vehicle B which precedes said virtual clone A' on said second lane respecting said safe inter-vehicle separation distance 4 as illustrated in FIG. 2c. To this end, said controller is capable of correlating said final position with the relative position of a vehicle directly downstream of said final position in order to manage a displacement of said vehicle on which it is provided by activating the guidance system of said vehicle on which it is provided or cooperating with said guidance system.

Figure 2D:
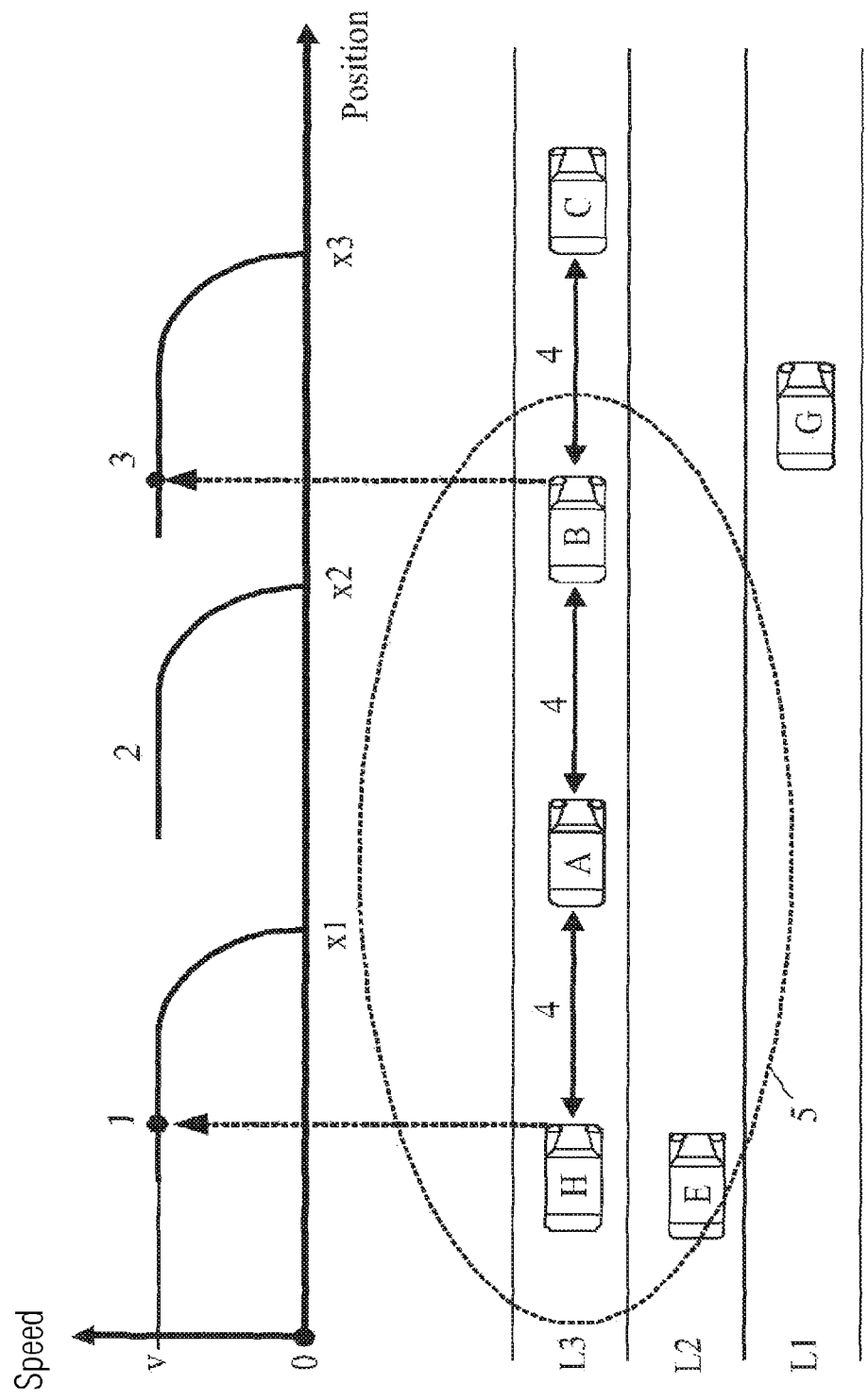

Once the distance separating said virtual clone A' of vehicle B which precedes it and vehicle H which follows it is greater than or equal to said safe inter-vehicle distance, said controller is capable of cooperating with or activating said guidance system in order to perform the change of lane, permitting said vehicle A to pass from its initial position on said first lane L2 to said final position on said second lane L3, as illustrated in FIG. 2d.

In summary, the method and the system for active lane-changing assistance according to the invention have several advantages relative to the methods and systems for active lane-changing assistance, in that:

they ensure a safe change of lane;
they permit the implementation of a change of lane irrespective of the availability of an adjacent free space and irrespective of the state of the traffic;
they permit the active creation of an adjacent free space by actively creating an insertion gap for a vehicle wishing to perform a change of lane;
they permit an autonomous implementation of a change of lane of a vehicle;
they permit a hierarchy to be put in place in the creation of insertion gaps. For example, certain vehicles may, in particular, be optionally programmed in order to be priority vehicles capable of systematically ignoring clones which are in front, whilst being capable of creating said clones. An important application would thus be, in particular, a prioritization of emergency vehicles which in this case would always have priority over other vehicles to change lane, without being hindered by another non-priority vehicle.

The invention claimed is:

1. A method for providing lane-changing assistance to a motor vehicle and configured to assist the vehicle to actively maneuver a change of lane from an initial position on a first lane to a final position on a second lane, which method comprises the steps of:
   determining the initial position of the vehicle and transmitting the initial position to a controller of a lane-changing assistance system of the vehicle;
   determining at least one relative position of at least one other vehicle detected in a vicinity of the vehicle and transmitting the relative position to the controller;
   determining the final position in dependence on a set of final data containing at least the initial position and at least the relative position;
   creating a virtual clone of the vehicle;
   attributing to the virtual clone localization datum containing at least the final position, the localization datum being configured to simulate by means of the virtual clone a presence of a dummy real vehicle in the final position;
   emitting, via a communication device of the lane-changing assistance system of the vehicle, the localization datum configured to be received by a further communication device of a further lane-changing assistance system provided on the other vehicle; and
   managing, via each said controller provided in the lane-changing assistance system of which the communication device has emitted or received the localization datum, a displacement of the vehicle provided with the controller in dependence on the localization datum.

2. The method according to claim 1, wherein the set of final data contains a localization datum of a virtual clone of another vehicle.

3. The method according to claim 1, wherein the localization datum of the virtual clone contains geodesic coordinates of the final position and characteristic data of the vehicle wishing to perform a change of lane.

4. The method according to claim 1, wherein the step of managing the displacement including managing a displacement from the initial position to the final position of the vehicle, of which the lane-changing assistance system has emitted the localization datum.

5. The method according to claim 1, wherein the managing of the displacement includes management of repositioning on the second lane of every other vehicle located upstream of the dummy real vehicle and of which the communication device of the lane-changing system provided on the vehicle has received the localization datum.

6. The method according to claim 1, wherein the managing step creates an insertion gap at a location of the final position.

7. A method for providing lane-changing assistance to a motor vehicle and configured to assist the vehicle to actively maneuver a change of lane from an initial position on a first lane to a final position on a second lane, which method comprises the steps of:
   determining the initial position of the vehicle and transmitting the initial position to a controller of a lane-changing assistance system of the vehicle;
   determining at least one relative position of at least one other vehicle detected in a vicinity of the vehicle and transmitting the relative position to the controller;
   determining the final position in the dependence on a set of final data containing at least the initial position and at least the relative position;
   creating a virtual clone of the vehicle;
   attributing to the virtual clone localization datum containing at least the final position, the localization datum being configured to simulate by the means of the virtual clone a presence of a dummy real vehicle in the final position;
   emitting, via a communication device of the lane-changing assistance system of the vehicle, the localization datum configured to be received by a further communication device of a further lane-changing assistance system provided on the other vehicle; and
   managing, via each said controller provided in the lane-changing assistance system of which the communication device has emitted or received the localization datum, a displacement of the vehicle provided with the controller in dependence on the localization datum; and
   wherein a reception of a first and a second localization datum by a same communication device of a lane-changing assistance system of a vehicle is capable of triggering a safety procedure for the vehicle.

8. The method according to claim 1, wherein the creating step is influenced by reception of localization datum of a virtual clone of another vehicle.

9. The method according to claim 1, wherein the managing step includes determining a field of movement for the vehicle.

10. A lane-changing assistance system to be provided on a motor vehicle and to facilitate a lane-changing maneuver from an initial position on a first lane to a final position on a second lane, said lane-changing assistance system comprising:
   a controller;
   a localization device for determining the initial position of the vehicle and transmitting the initial position to said controller;
   an obstacle detection system for determining at least one relative position of at least one other vehicle relative to the vehicle and transmitting the relative position of the other vehicle to said controller;
   said controller determining the final position in dependence on a set of final data containing at least the initial position;
   a device for generating a virtual clone capable of creating a virtual clone of the vehicle and simulating by means of the virtual clone a presence of a dummy real vehicle in the final position by generating localization datum of the virtual clone of the vehicle configured to permit a localization of the virtual clone in the final position; and a communication device capable of exchanging at least one localization datum with at least one further communication device provided in a further lane-changing assistance system of another vehicle and with said controller.

11. The system according to claim 10, wherein said controller has a mapping system, a movement management unit and said device for generating the virtual clone.

12. The system according to claim 10, wherein said controller manages the displacement of the vehicle in dependence on the set of final data.

13. The system according to claim 10, wherein the localization datum contains geodesic coordinates of the final position and characteristic data of the vehicle.

14. he system according to claim 10, wherein said controller cooperates with a system to control the vehicle and configured to guide the vehicle.

15. The system according to claim 12, wherein said controller manages a displacement of the vehicle from the initial position to the final position.

16. The system according to claim 12, wherein said controller manages a displacement of the vehicle and creates an insertion gap for another vehicle.

* * * * *